Dec. 14, 1965 E. D. SIMSHAUSER 3,223,029

INFORMATION TRANSLATING APPARATUS

Filed Nov. 13, 1962

INVENTOR
ELVIN D. SIMSHAUSER

BY Morris L. Rabkin

United States Patent Office 3,223,029
Patented Dec. 14, 1965

3,223,029
INFORMATION TRANSLATING APPARATUS
Elvin D. Simshauser, Merchantville, N.J., assignor to Radio Corporation of America, a corporation of Delaware
Filed Nov. 13, 1962, Ser. No. 237,212
5 Claims. (Cl. 101—93)

The present invention relates to information translating apparatus, and particularly to apparatus for printing information in legible form on a document.

The invention is especially suitable for use in a printer which prints information from coded electrical signals. Such signals may, for example, be derived from electronic data processing equipment or from digital communications equipment.

It is desirable to provide apparatus for printing characters of the alpha-numeric type or other symbol representing information at very high speeds, since electronic data processing and communications equipment are now capable of supplying the characters which make up a message very rapidly. Since it is usual, in business practice, to use data printed on pages, it is desirable that printing be done on a line-by-line basis to provide page length documents. Page printers for printing digital data which are presently available are usually complex and expensive mechanisms which occupy a large amount of space. Another requirement is that multiple copies be available. The cost and complexity of printing apparatus known in the art usually increases with the number of copies required.

An important part of a printer is the device which actually prints the characters on the document. These devices are called print heads in the art. Most print heads are heavy, mechanical or electro-mechanical devices which are expensive to build and maintain and which usually must be fixedly mounted because of large size, weight and other problems.

Accordingly, it is an object of the present invention to provide improved apparatus for rapidly printing legible characters in response to coded electrical signals.

It is a still further object of the present invention to provide an improved print head which is compact in size and low in cost.

It is a still further object of the present invention to provide an improved print head capable of being scanned across a page to print successive lines on a page length document.

It is a still further object of the present invention to provide an improved print head capable of making multiple copies of a printed document.

Briefly described, the present invention may be embodied in a print head which is adapted to form characters by impact printing of successive columns of dots on a document. The print head includes a plurality of magnetic core structures and printing elements which may be impact elements or styli and which are disposed in orthogonal relationship with the core structures. The core structures may be stacked to form a vertical array. Each core structure co-operates with a different one of a plurality of styli which are disposed in horizontally stacked relationship. The core structures may be linked by different coils which, when energized by driving signals, cause their respective styli to impact one or more sheets of carbon paper against one or more sheets of document paper to form a column of dots. The print head may be compact and of miniature size to permit scanning across a line. Successive rows of dots may be printed to form successive characters on the line. As the document is translated in a direction transverse to the direction of scanning of the print head, successive lines of characters may be printed on the document.

The invention itself, both as to its organization and method of operation, as well as additional objects and advantages thereof, will become more readily apparent from a reading of the following description in connection with the accompanying drawings, in which.

Figure 1:
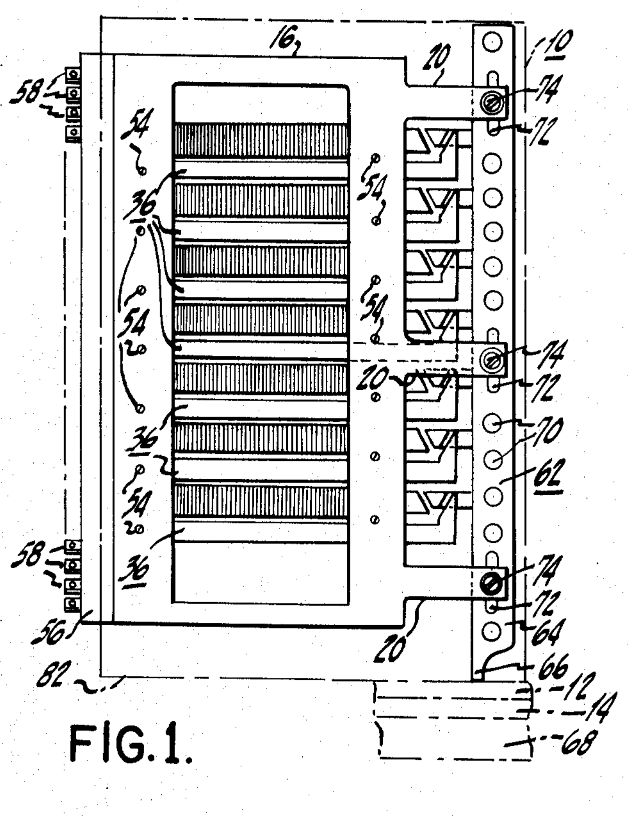
FIG. 1 is a front elevational view of a print head embodying the invention.
Figure 2:
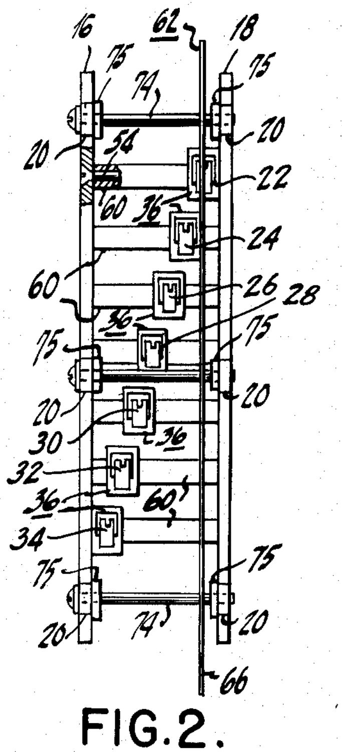
FIG. 2 is an end elevational view of the head shown in FIG. 1, as viewed from the right in FIG. 1, with certain parts removed to clarify the illustration.

Referring more particularly to FIGS. 1 and 2, there is shown the construction of a print head 10 embodying the invention. The drawings are somewhat enlarged to clarify the illustration. The print head may actually be very small (for example, 1½ inches long, 1 inch wide, ½ inch thick). Accordingly, the print head may be mounted on a head transport or carriage and scanned across juxtaposed sheets of carbon paper 12 and document paper 14 to print lines of characters. A pair of mounting frames 16 and 18 support the print head assembly. These frames are rectangular plates having a central opening. Tabs 20 project from one side of the frame. Seven print head units, 22, 24, 26, 28, 30, 32 and 34 are mounted in a vertically stacked array between the mounting frames 16 and 18. These print head units include magnetic core structures 36 which are essentially similar.

Figure 3:
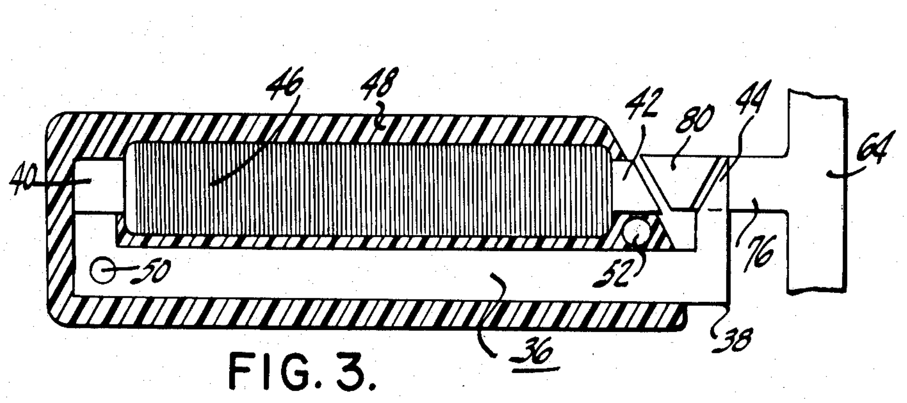
FIG. 3 is an enlarged fragmentary, elevational view showing the magnetic structure of an individual unit of the head illustrated in FIGS. 1 and 2.
Figure 4:
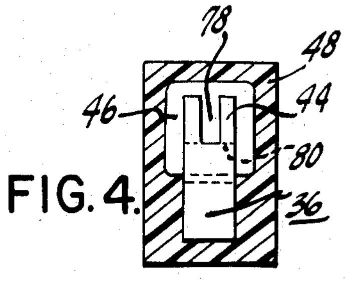
FIG. 4 is a fragmentary, end elevational view of the magnetic structure shown in FIG. 3.

A single magnetic core structure 36 is shown in FIGS. 3 and 4 and includes a pair of core sections 38 and 40 made up of laminations of magnetic material. A high permeability magnetic material, such as an iron-cobalt alloy, may be used. Laminations of the material known as "Permendur" sold by the Allegheny Ludlum Steel Corporation of Pittsburgh, Pennsylvania, is suitable. One of the core sections 40 is generally trapezoidal in shape and has a pole end 42 which is beveled at an angle of about 45°. The other core section 38 is "U" shaped and has two ends, one of which provides a pole end 44. The pole end 44 is also desirably beveled at an angle of about 45°, and is opposed to the pole end 42 to define an air gap therebetween which diverges in a direction outwardly of the structure 36. The opposite end of the "U" shaped core section 38 is in contact with the end of the core section 40 opposite to the pole end 42 thereof. A magnetic circuit is therefore defined around the magnetic structure 36.

This magnetic circuit is energized by a coil 46 which is wound around the core section 40. The coil 46 may be wound around the other core section 38, if desired. When current passes through the coil 46, a magnetic flux is established in the structure 36 and across the air gap between the pole ends 42 and 44. Each of the magnetic structures 36 is individually encased in a body 48 of electrical insulating material. This may be accomplished by placing the structure 36, with the coil 46 wound thereon, in a mold and filling the mold with a potting compound, such as an epoxy potting resin. The mold is arranged so that the resin does not interfere with the air gap. Mounting holes 50 and 52 are drilled, respectively, near one corner of the core section 38 and through the body 48 of insulating material in the opening between the core sections 38 and 40.

The magnetic structures 36 are mounted between the frames 16 and 20 on bolts 54 which extend through the mounting frames and through the holes 50 and 52 in the magnetic structures 36 of the different head units 22, 24, 26, 28, 30, 32 and 34.

As shown in FIG. 1, a terminal strip 56 is secured along the back edge of the mounting frames 16 and 18. Leads (not shown) connect the ends of the coils 46 to different terminals 58 on the strip 56.

As shown in FIG. 2, the magnetic structures 36 are mounted offset from each other in laterally spaced relation between the mounting frames 16 and 18. Bushings 60 maintain the structures 36 in the desired offset, laterally spaced relationship.

Each of the head units 22, 24, 26, 28, 30, 32 and 34 includes a separate stylus assembly 62. By the term "stylus" or "stylus assembly," as used herein, is meant any element which acts either by impact action or in the manner of a stylus. The styli assemblies 62 are in parallel, spaced relationship, each cooperating with a different magnetic structure 36. Each of the stylus assemblies include a flag 64 which has a tapered tip 66 for impacting the carbon paper 12 and the document paper 14 against an anvil 68 (shown in phantom in FIG. 1). The flags 64 extend longitudinally the entire height of the print head 10 and have a plurality of holes 70 and three slots 72. The holes 70 serve to lighten the flags 64. Bolts 74, extending between the tabs 20 which project from the frames 16 and 18, pass through these slots 72 and support the flags 64 for longitudinal motion. Bushings 75 around the bolts 74 prevent sidewise or lateral movement of the stylus assemblies 62. Each flag 64 has a tab 76 which extends inwardly towards its associated magnetic structure 36 and through a slot 78 in the pole end 44 (see FIG. 4).

A block 80 of magnetic material (FIG. 3) of trapezoidal shape is secured to the end of the tab 76. The block 80 may be made of a plurality of laminations of the same type of magnetic material as that of which the magnetic structure 36 is made. The magnetic block 80 is tapered to diverge in a direction outwardly of the magnetic structure 36 in a manner complementary to the 45° bevel of the pole ends 42 and 44. This angle of 45° provides for maximum and uniform magnetic forces on the block 80 over the entire travel thereof.

The assembled frames 16 and 18, magnetic structures 36, and stylus assemblies 62 may be mounted in a case 82 shown in phantom in FIG. 1. The tips 66 of the flags 64 may extend through a slot in the bottom of the case 82. The bottom of the case 82 and the tips 66 of the flags of the stylus assemblies 62 may normally be disposed in contact with the uncoated side of the carbon paper 12. The carbon paper 12 and the document paper 14 are maintained by their transport mechanism under tension as they pass the print head 10. The papers 12 and 14 locate the magnetic blocks 80 in the air gap between the pole ends 42 and 44 of the magnetic structure 36 because of the dimensional relationship of the parts of the head 10. In other words, the paper acts as a stiff spring suspension for maintaining the stylus assemblies normally in positions where they do not apply printing pressures against the paper. Alternatively, a spring suspension for the stylus assemblies may be used.

When a selected coil 46 is energized, magnetic flux passes around the magnetic structure 36 on which the selected coil is wound and across the air gap between its pole ends 42 and 44. A force related to the flux is exerted on the magnetic body 80 and tends to draw the magnetic body 80 downward into the air gap. The flag 64 of the stylus assembly 62 moves downwardly and impacts the papers 12 and 14 against the anvil 68. The movement of the stylus assemblies is perpendicular to the papers 12 and 14, since such perpendicular paths of movement are established by the slots 72 in the flag 64 and in the bolts 74 which pass therethrough.

The compact construction provided by the vertically stacked arrangement of magnetic structures 36 and the horizontally stacked arrangement of cooperating stylus assemblies 62, as well as the magnetic efficiency of the magnetic structures 36 and their cooperating magnetic blocks 80, provides a compact and light weight electromagnetic print head which is capable of scanning across a document for line-by-line page printing.

Variations and modifications in the disclosed print head coming within the scope of the invention will undoubtedly suggest themselves to those skilled in the art. The foregoing description should therefore be taken as illustrative and not in any limiting sense.

What is claimed is:

1. Printing apparatus for printing columns of dots on a document to form a character, said apparatus comprising a plurality of magnetic core structures disposed in vertically stacked relationship, each of said core structures having an air gap therein, a plurality of stylus assemblies having flag members arranged in side-by-side relationship and having stylus tips for forming said column of dots on said document, said members extending vertically past said vertically stacked core structures, each of said flag members having a portion extending outwardly toward a different one of said core structures, bodies of magnetic material mounted on said portions and extending into said gaps, and signal coils wound around said core structures.

2. Apparatus for printing columns of dots to form characters on a document comprising a plurality of core structures stacked in laterally and vertically offset relationship from each other, each of said core structures having pole ends opposite each other defining an air gap therebetween, a plurality of thin strip members disposed in side-by-side relationship and extending longitudinally past said stacked core structures, each of said members having a stylus tip at one end thereof for forming a dot of said column of dots on said document, a plurality of magnetic bodies mounted on different ones of said strip members and disposed each in a different one of said gaps, and coils linking each of said magnetic structures for establishing magnetomotive forces in said gap for attracting said magnetic bodies and translating said strip members to impact said stylus tips thereof against said documents.

3. Printing apparatus for printing columns of dots to form characters in response to electrical signals comprising a plurality of magnetic core structures, each including a "U" shaped core section of magnetic material and having a pole at one end thereof, another core section extending across said "U" shaped section to define a loop magnetic circuit, said other section having a pole end spaced from said pole end of said "U" shaped section to define an air gap therebetween, each of said pole ends being beveled so that said air gap diverges outwardly from said core structure, and a signal coil wound around one of said core sections of each said core structure, said core sections being disposed in a stacked array with said air gaps arranged near one end thereof, a plurality of stylus members each having a stylus tip at one end thereof, said members extending longitudinally across said array near said one end of said core structure and being disposed in side-by-side relationship so that said stylus tips define said column of dots when said stylus members are longitudinally translated, tab members extending from different ones of said strip members towards different ones of said core structures, and trapezodial blocks of magnetic material each carried by a different one of said tab members and each being disposed in a different one of said air gaps, said trapezodial blocks being attracted inwardly toward different ones of said core structures for longitudinally translating said stylus members when said signal coils are energized.

4. Printing apparatus for dot impact printing comprising a plurality of stylus assemblies arranged in side-by-side relationship for printing a column of dots when moved in one direction, each of said assemblies having a magnetic member projecting therefrom, a plurality of magnetic core structures disposed in stacked relationship in said one direction and extending perpendicularly with respect to said stylus assemblies, each of said core structures having a pair of fixed pole pieces defining an air gap receiving the magnetic member of a different one of said stylus assemblies, and a plurality of coils each individually linked to a different one of said core structures for energizing said structures to change the positions of the respective magnetic members in their associated air gaps, and means restricting said assemblies to movement in only said one direction.

5. Apparatus for dot impact printing comprising a plurality of stylus assemblies each including a strip member having a stylus tip at one end thereof, said members being arranged in laterally stacked relationship with their stylus tips disposed to define a column of dots when said members are translated in a direction longitudinally thereof, a plurality of magnetic core structures disposed in stacked relationship longitudinally of said members and each having an air gap, each of said stylus assemblies including magnetic means extending therefrom and being located for movement in the air gap of a different magnetic core structure, a plurality of coils each coupled to a different one of said core structures, and first and second frame members holding said stylus assemblies and said core structures in the above-mentioned stacked relationships and including means restricting the movement of said strip members to translatory motion in said direction longitudinally thereof.

References Cited by the Examiner

UNITED STATES PATENTS

| | | | |
|---|---|---|---|
| 2,681,614 | 6/1954 | Rast | 101—93 |
| 2,694,362 | 11/1954 | Paige | 103—93 |
| 2,757,604 | 8/1956 | Von Glahn | 197—1 X |
| 2,881,697 | 4/1959 | Kistner et al. | 101—93 |
| 2,869,455 | 1/1959 | Knutson | 101—93 |
| 2,976,801 | 3/1961 | Dirks | 178—30 X |

WILLIAM B. PENN, *Primary Examiner.*